US012510100B2

(12) United States Patent
Liao

(10) Patent No.: US 12,510,100 B2
(45) Date of Patent: Dec. 30, 2025

(54) ELECTRIC OIL PUMP

(71) Applicant: ACODEX ENTERPRISE CO., LTD., Taipei (TW)

(72) Inventor: Kuo-An Liao, Taipei (TW)

(73) Assignee: ACODEX ENTERPRISE CO., LTD., Taipei (TW)

( * ) Notice: Subject to any disclaimer, the term of this patent is extended or adjusted under 35 U.S.C. 154(b) by 162 days.

(21) Appl. No.: 18/529,254

(22) Filed: Dec. 5, 2023

(65) Prior Publication Data

US 2025/0136430 A1 May 1, 2025

(30) Foreign Application Priority Data

Oct. 27, 2023 (TW) ................................ 112141432

(51) Int. Cl.
*F04D 29/62* (2006.01)
*B05B 9/04* (2006.01)
(Continued)

(52) U.S. Cl.
CPC ............ *F04D 29/628* (2013.01); *B67D 7/04* (2013.01); *B67D 7/66* (2013.01); *B67D 7/68* (2013.01);
(Continued)

(58) Field of Classification Search
CPC .. F04D 13/068; F04D 29/4293; F04D 29/628; F04D 29/426; F04D 29/605; F04D 29/708; F04D 13/0686; F04D 15/0066; F04D 29/406; F04D 13/06; F04D 13/16; F04D 13/021; F04D 13/0693; F04D 15/0209; B67D 7/04; B67D 7/68; B67D 7/66; F04B 17/03; F04B 17/06;
(Continued)

(56) References Cited

U.S. PATENT DOCUMENTS 6,162,194 A * 12/2000 Shipp .................... F04D 13/021 604/151
8,721,306 B2 * 5/2014 Andersen .............. F04D 29/628 310/43
(Continued)

FOREIGN PATENT DOCUMENTS

CN 211144832 U 7/2020
CN 113090487 A 7/2021

*Primary Examiner* — Peter J Bertheaud
(74) *Attorney, Agent, or Firm* — MUNCY, GEISSLER, OLDS & LOWE, P.C.

(57) ABSTRACT

An electric oil pump includes a base portion, a pump portion, a power supply, a mechanical switch and a pressure trigger. The base portion has a fluid passage. The pump portion is disposed on the base portion. The power supply is provided with an electric power to the pump portion. The mechanical switch is electrically connected the pump portion and the power supply, and has a pressing member. When the pressing member is not pressed, the mechanical switch is in a conductive state, and when the pressing member is pressed, the mechanical switch is in a non-conductive state. The pressure trigger is located between the mechanical switch and the fluid passage, capable of pressing the pressing member when the pressure in the fluid passage is above an upper threshold and releasing the pressing of the pressing member when the pressure in the fluid passage is below a lower threshold.

18 Claims, 10 Drawing Sheets

(51) Int. Cl.

| | |
|---|---|
| ***B67D 7/04*** | (2010.01) |
| ***B67D 7/66*** | (2010.01) |
| ***B67D 7/68*** | (2010.01) |
| ***F04B 17/03*** | (2006.01) |
| ***F04B 23/02*** | (2006.01) |
| ***F04B 39/12*** | (2006.01) |
| ***F04B 39/14*** | (2006.01) |
| ***F04B 49/02*** | (2006.01) |
| ***F04B 49/06*** | (2006.01) |
| ***F04D 13/02*** | (2006.01) |
| ***F04D 13/06*** | (2006.01) |
| ***F04D 13/16*** | (2006.01) |
| ***F04D 15/00*** | (2006.01) |
| ***F04D 15/02*** | (2006.01) |
| ***F04D 29/40*** | (2006.01) |
| ***F04D 29/42*** | (2006.01) |
| ***F04D 29/60*** | (2006.01) |
| ***F04D 29/70*** | (2006.01) |

(52) U.S. Cl.
CPC ............ *F04B 17/03* (2013.01); *F04B 23/021* (2013.01); *F04B 23/023* (2013.01); *F04B 39/121* (2013.01); *F04B 39/14* (2013.01); *F04B 49/02* (2013.01); *F04B 49/06* (2013.01); *F04D 13/021* (2013.01); *F04D 13/06* (2013.01); *F04D 13/068* (2013.01); *F04D 13/0686* (2013.01); *F04D 13/0693* (2013.01); *F04D 13/16* (2013.01); *F04D 15/0066* (2013.01); *F04D 15/0209* (2013.01); *F04D 29/406* (2013.01); *F04D 29/426* (2013.01); *F04D 29/4293* (2013.01); *F04D 29/605* (2013.01); *F04D 29/708* (2013.01); *B05B 9/0426* (2013.01)

(58) Field of Classification Search
CPC ...... F04B 23/021; F04B 39/121; F04B 49/02; F04B 39/14; F04B 23/023; F04B 49/06
See application file for complete search history.

(56) References Cited

U.S. PATENT DOCUMENTS

| | | | | |
|---|---|---|---|---|
| 10,047,737 | B2 * | 8/2018 | Meza ...................... | F04B 53/22 |
| 10,808,687 | B1 * | 10/2020 | Uccellani ................ | F04C 13/00 |

* cited by examiner

ELECTRIC OIL PUMP

BACKGROUND OF THE INVENTION

Field of the Invention

This invention relates to pump structures, particularly to an electric oil pump.

Related Prior Art

Oil for agricultural or industrial use is typically stored in an oil drum for transport. When oil is needed, an electric oil pump is used to extract the oil from the drum. The electric oil pump has an inlet and an outlet. The inlet is fixed to the opening of the drum and is connected to a dip tube that can extend into the drum. During the oil extraction operation of the electric oil pump, the oil from the drum flows through the dip tube to the outlet and is dispensed through a dispensing nozzle connected to the outlet. Existing electric pumps are required to start when the trigger of the dispensing nozzle is pressed, and conversely, to immediately stop when the trigger of the dispensing nozzle is released. However, existing electric pumps still need improvement to meet these requirements, save manufacturing costs, and reduce failure rates.

SUMMARY OF THE INVENTION

An object of the present application is to provide an electric oil pump.

In order to achieve the above object, the following technical solution is provided according to the present application.

According to an embodiment of the present application, the electric oil pump comprises a base portion, a pump portion, a power supply, a mechanical switch and a pressure trigger. The base portion can be assembled on an oil drum and has a fluid passage. The pump portion is disposed on the base portion, capable of executing an oil pumping operation to allow oil from the oil drum to flow through the fluid passage in the base portion. The power supply is configured to provide an electric power required for the pumping operation of the pump portion. The mechanical switch is configured to electrically connect the pump portion and the power supply, and has a pressing member. When the pressing member is not pressed, the mechanical switch is in a conductive state, and when the pressing member is pressed, the mechanical switch is in a non-conductive state. The pressure trigger is located between the mechanical switch and the fluid passage, capable of pressing the pressing member when the pressure in the fluid passage is above an upper threshold and releasing the pressing of the pressing member when the pressure in the fluid passage is below a lower threshold.

In an embodiment of the present application, the pressure trigger of the electric oil pump comprises a casing and a movable element. The casing has a channel and a chamber that communicate with each other. The movable element has a bottom end located within the chamber of the casing and a top end. The top end extends out of the casing through the channel and contacting the pressing member of the mechanical switch. The movable element is normally in a non-triggered position where the pressing member is not pressed, and is movable from the non-triggered position to a triggered position under the pressure in the fluid passage, and presses the pressing member at the triggered position.

In an embodiment of the present application, the pressure trigger of the electric oil pump further comprises a buffer mechanism disposed on the casing, the buffer mechanism is configured to decelerate the return of the movable element from the triggered position to the non-triggered position.

In an embodiment of the present application, the aforementioned the casing of the pressure trigger comprises has an aperture communicated to the channel, and the pressure trigger further comprises a spring and a detent ball both located within the channel. The spring pushes the detent ball against the movable element, keeping the detent ball in a position against the movable element.

In an embodiment of the present application, the aforementioned the movable element of the pressure trigger further has a ring groove, into which the detent ball can slide.

In an embodiment of the present application, the electric oil pump further comprises a power switch and a safety switch, wherein one end of the power supply is electrically connected to one end of a motor of the pump portion, the other end of the motor is electrically connected to one end of the power switch, one end of the power switch is electrically connected to one end of the mechanical switch, and one end of the mechanical switch is electrically connected to one end of the safety switch, the other end of the safety switch is electrically connected to the other end of the power supply.

In an embodiment of the present application, the electric oil pump further comprises a power switch, wherein one end of the power supply is electrically connected to one end of a motor of the pump portion, the other end of the motor is electrically connected to one end of the power switch, one end of the power switch is electrically connected to one end of the mechanical switch, and the other end of the mechanical switch is electrically connected to the other end of the power supply.

In an embodiment of the present application, the aforementioned the pump portion is detachable from and attachable to the aforementioned the base portion. The mechanical switch is disposed in the base portion, the power switch and safety switch are disposed in the pump portion, and a top of the base portion facing the pump portion has two exposed second electrical contacts, which are electrically connected to the two ends of the mechanical switch. A bottom of the pump portion facing the base portion has two exposed second electrical contacts. One of the second electrical contacts is electrically connected to the other end of the power switch and the other second electrical contact is electrically connected to the end of the safety switch. When the pump portion is attached to the base portion, the two first electrical contacts of the base portion are electrically connected to the two second electrical contacts of the pump portion. When the pump portion is detached from the base portion, the two first electrical contacts of the base portion are separated from the two second electrical contacts of the pump portion.

In an embodiment of the present application, the aforementioned the top of the base portion has a convex cover, the mechanical switch is located within the convex cover, the two first electrical contacts are positioned on the top surface of the convex cover, the bottom of the pump portion has an accommodation where the two second electrical contacts are located. When the pump portion is assembled onto the base portion, the convex cover fits precisely into the accommodation.

In an embodiment of the present application, the aforementioned the pump portion includes an outer housing and an inner housing located within the outer housing. The power switch is disposed on an outer wall of the inner housing. The motor is located within the inner housing, and a top of the motor protrudes from the inner housing. The outer wall of the inner housing has a plurality of wire hooks. The wires from the power supply, motor, power switch, mechanical switch, and safety switch are routed along the outer wall of the inner housing, and the wire hooks are used to secure the wires in place.

The above and other elements, features, steps, characteristics and advantages of the present disclosure will become more apparent from the following detailed description of the example embodiments with reference to the attached drawings.

DETAILED DESCRIPTION OF EMBODIMENTS

Figure 1:
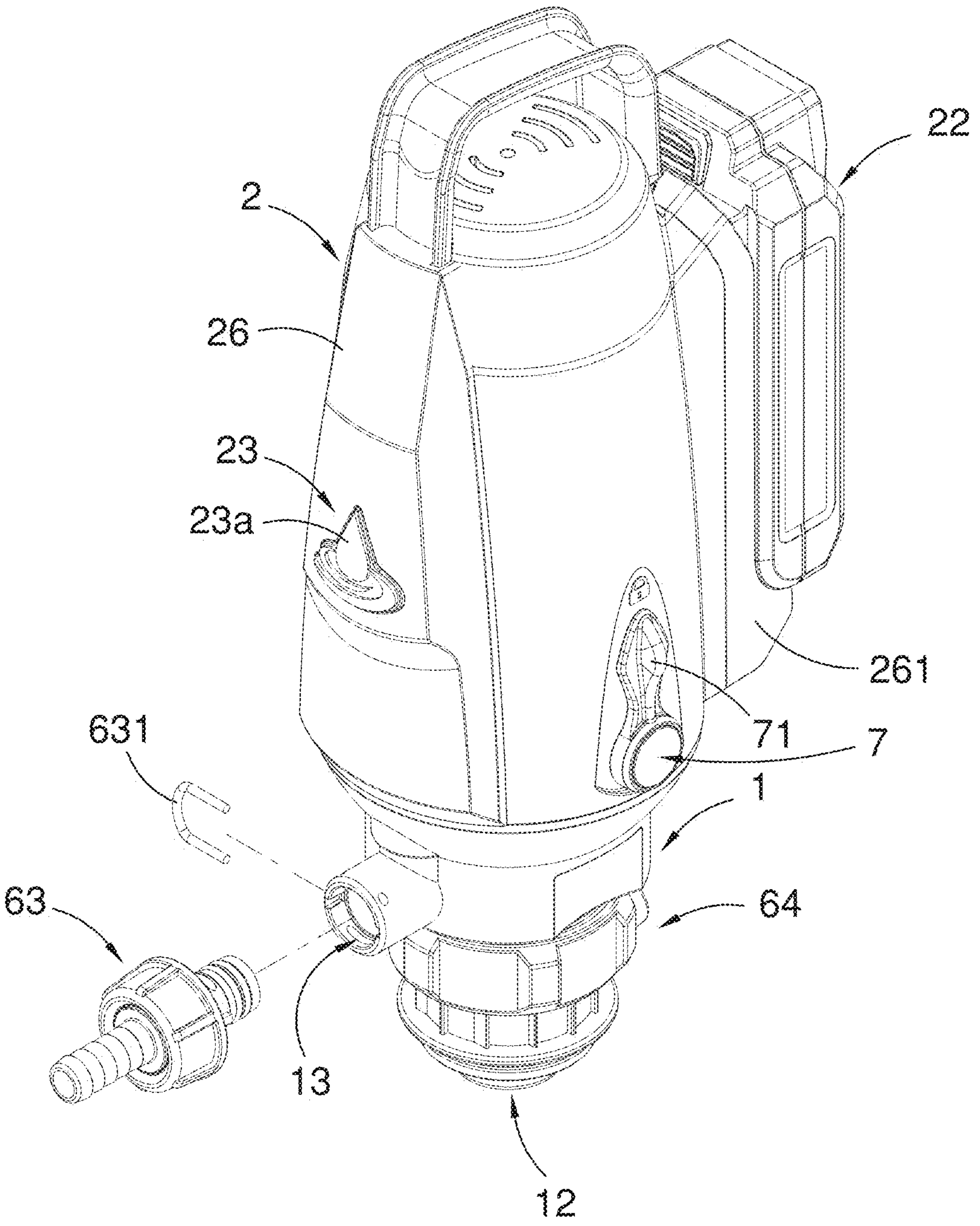
FIG. 1 is a three-dimensional exterior view of an embodiment of the electric oil pump of the present invention.
Figure 2:
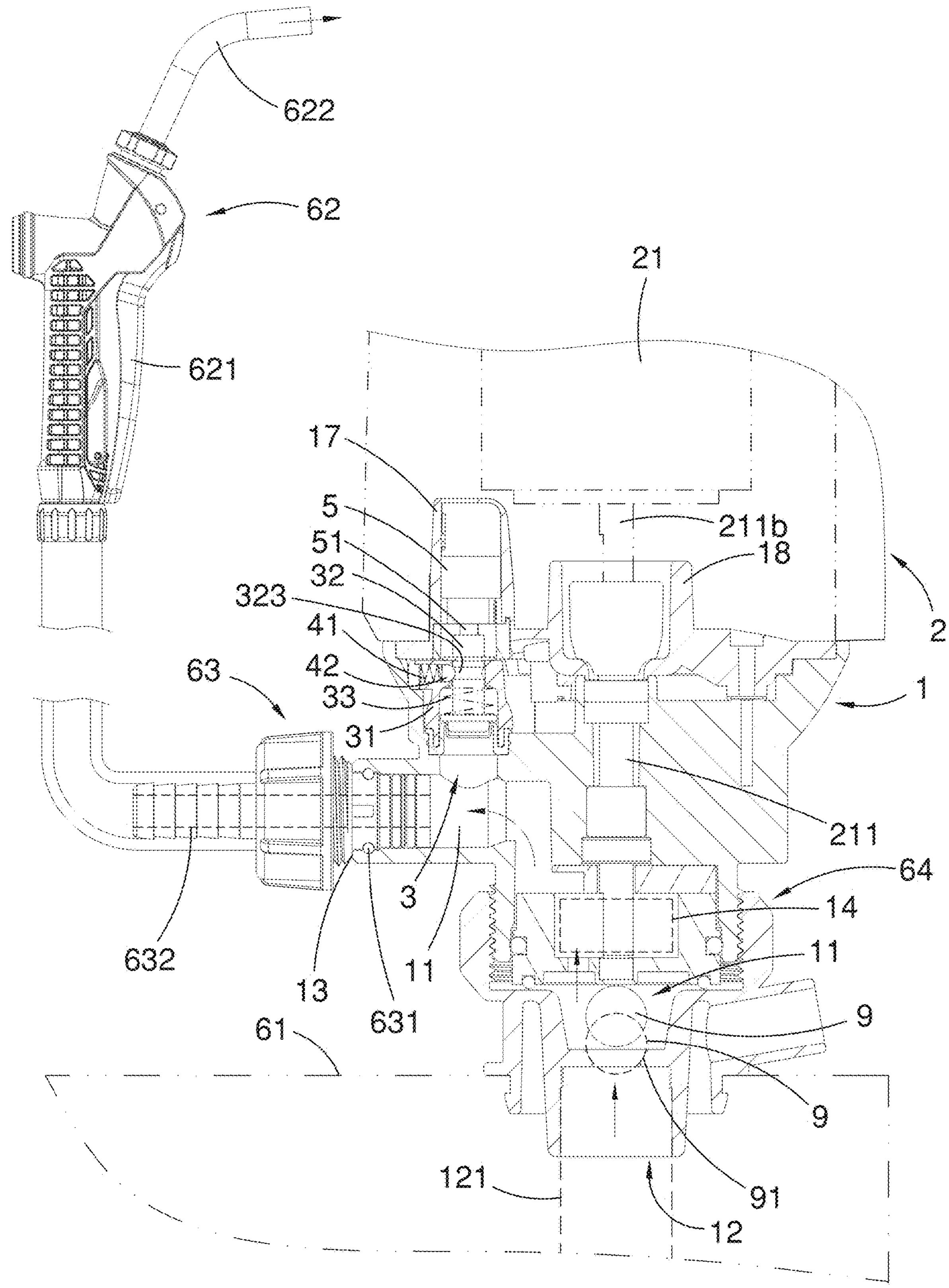
FIGS. 2 and 3 illustrate schematic diagrams (partial cross-section) of the operation of this embodiment of the present invention.

FIG. 1 and FIG. 2 illustrate an embodiment of the electric oil pump of the present invention. In this embodiment, the electric oil pump comprises a base portion 1, a pump portion 2, a power supply 22, a power switch 23, a pressure trigger 3, and a mechanical switch 5. The pump portion 2 is disposed on the base portion 1 to perform an oil pumping operation. In this embodiment, the base portion 1 and the pump portion 2 are separable (as will be described later), but they can also be integrated. The power supply 22 supplies power required for the pump portion 2 and can be a battery, such as a rechargeable battery, but is not limited to this. The power switch 23, pressure trigger 3, and mechanical switch 5 together form an oil pumping control mechanism to determine the execution of starting or stopping the oil pumping operation by the pump portion 2. Preferably, the oil pumping control mechanism also includes a safety switch 27 (see FIG. 10), as will be described later.

As shown in FIG. 2, the base portion 1 has an internal fluid passage 11. One end of the fluid passage 11 is connected to an inlet 12 on a container lock adapter 64, and the other end of the fluid passage 11 is connected to an outlet 13 on the base portion 1. The outlet 13 is typically connected to one end of a pipe joint 63 and secured using a fastener 631 to prevent it from coming off. The other end of the pipe joint 63 is connected to a dispensing nozzle 62. The dispensing nozzle 62 communicates with a channel 632 of the pipe joint 63. When the base portion 1 is mounted on an opening of an oil drum 61 by the container lock adapter 64 (not shown in the figure), the inlet 12 is inside the oil drum 61, and the bottom end of a dip tube 121 threaded into the inlet 12 is close to the bottom of the oil drum 61.

The pumping portion 2 comprises a motor 21, a drive shaft 211, and an impeller 14 (shown in broken lines in the figure). The motor 21 is connected to the top end of the drive shaft 211, and the impeller 14 is connected to the bottom end of the drive shaft 211 and is located within the fluid passage 11. The motor 21 is capable of driving the drive shaft 211 to rotate, and the rotation of the drive shaft 211 drives the impeller 14 to rotate. In this embodiment, the top end of the drive shaft 211 forms a gear groove 211*a* (refer to FIG. 7), and the bottom end of the rotor shaft 211*b* of the motor 21 is coupled to a gear 212 (refer to FIG. 9). The gear 212 can be inserted into the gear groove 211*a* and engage with it.

As shown in FIG. 2, the mechanical switch 5 has a pressing member 51. When the pressing member 51 has not been pressed (see FIG. 2), the mechanical switch 5 is in a conductive state. When the pressing member 51 is pressed (see FIG. 3), the mechanical switch 5 immediately enters a non-conductive state.

The pressure trigger 3 is located between the mechanical switch 5 and the fluid passage 11, and it is capable of pressing the pressing member 51 when the pressure in the fluid passage 11 exceeds an upper limit, causing the mechanical switch 5 to transition from the conductive state to the non-conductive state. The pressure trigger 3 can also release the pressing of the pressing member 51 when the pressure in the fluid passage 11 falls below a lower limit, causing the mechanical switch 5 to transition from the non-conductive state back to the conductive state.

Figure 3:
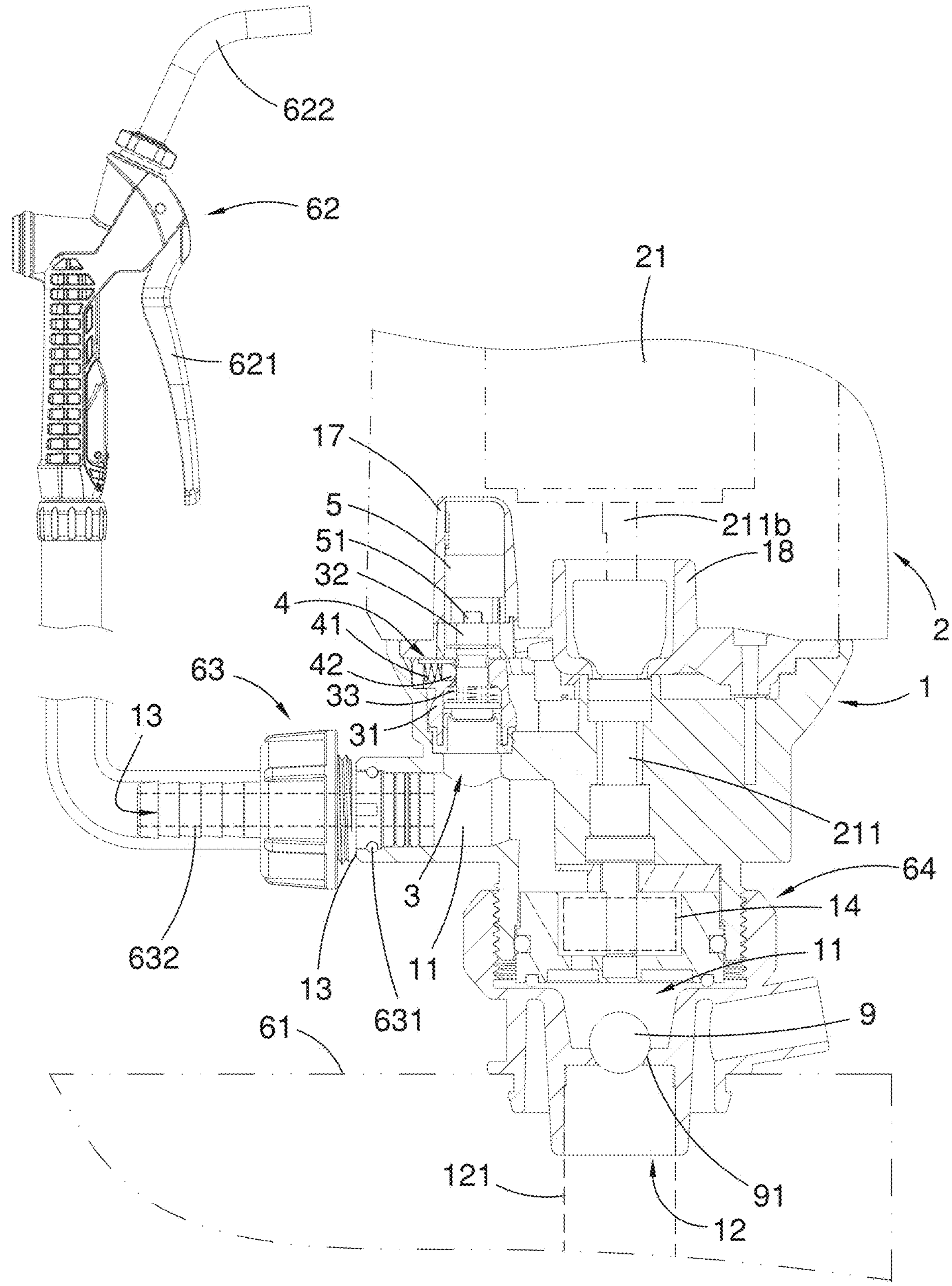
Figure 4:
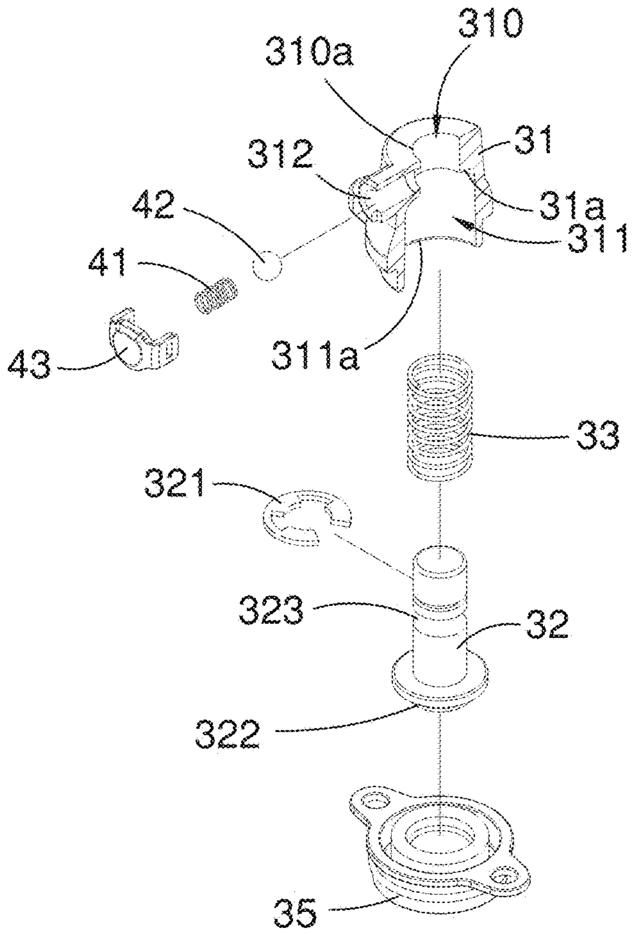
FIG. 4 illustrates a three-dimensional exploded view of the pressure trigger 3 of this embodiment of the present invention.
Figure 5:
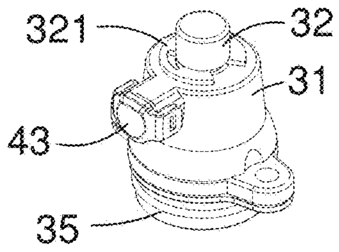
FIG. 5 shows a three-dimensional exterior view of the pressure trigger 3 in this embodiment of the present invention.

In this embodiment, as shown in FIG. 4 and FIG. 5, the pressure trigger 3 comprises a casing 31 and a movable element 32. Within the casing 31, there is a channel 310 and a chamber 311 that are in communication with each other. The upper end of the channel 310 forms the upper opening 310*a*, which faces the pressing member 51, and the lower end of the channel 310 is in communication with the chamber 311. The lower end of the movable element 32 is located within the chamber 311 of the casing 31. The upper end of the movable element 32 extends out of the casing 31 through the channel 310 and contacts the pressing member 51 of the mechanical switch 5 (see FIG. 2). The movable element 32 is normally in a non-triggered position (i.e., the original position, as seen in FIG. 2) without pressing the pressing member 51, so the mechanical switch 5 is normally in a conductive state. When the pressure in the fluid passage 11 increases and causes the movable element 32 to move from the non-triggered position to a triggered position in response (see FIG. 3), the upper end of the movable element 32 presses the pressing member 51, causing the mechanical switch 5 to transition from the conductive state to the non-conductive state. When the pressure in the fluid passage 11 decreases and causes the movable element 32 to respond by moving from the triggered position back to the non-triggered position, the upper end of the movable element 32 no longer presses the pressing member 51, causing the mechanical switch 5 to transition from the non-conductive state back to the conductive state.

In this embodiment, the pressure trigger 3 further includes an optional elastic reset component to assist the movable element 32 in returning to the non-triggered position. This elastic reset component includes an upper stop 321 disposed on the movable element 32 and located outside the casing 31, a lower stop 322 disposed on the movable element 32 and situated inside the casing 31, and a compression spring 33 inserted into the movable element 32 and positioned within the casing 31. The upper stop 321 can be engaged by the top of the casing 31 to prevent further downward movement of the movable element 32. The ends of the compression spring 33 abut against the lower stopper 322 and the inner wall 31*a* of the casing 31.

In this embodiment, as shown in FIG. 3, the compression spring 33 is compressed as the movable element 32 moves upward to the triggering position, storing potential energy. When the movable element 32 starts moving downward, the compressed spring 33 utilizes this stored energy to assist the movable element 32 in returning to the non-triggered position.

In this embodiment, the pressure trigger 3 further includes an elastic diaphragm 35 disposed on the casing 31, as shown in FIG. 3, though this is an optional feature. The elastic diaphragm 35 may be made of rubber or silicone, but not limit to them. The elastic diaphragm 35 covers the lower opening 311*a* beneath the chamber 311 of the casing 31, separating the chamber 311 from the fluid passage 11. The elastic diaphragm 35 can flex upward (see FIG. 3) or return to its original state (see FIG. 2) in response to pressure changes in the fluid passage 11.

As shown in FIG. 2, the bottom end of the movable element 32 abuts against the elastic diaphragm 35. When the elastic diaphragm 35 flexes upward, it pushes the movable element 32 upward through its central portion. Conversely, when the movable element 32 moves downward, the central portion of the elastic diaphragm 35 is pushed downward by the movable element 32, returning to its original position with the assistance of its inherent elasticity.

Figure 6:
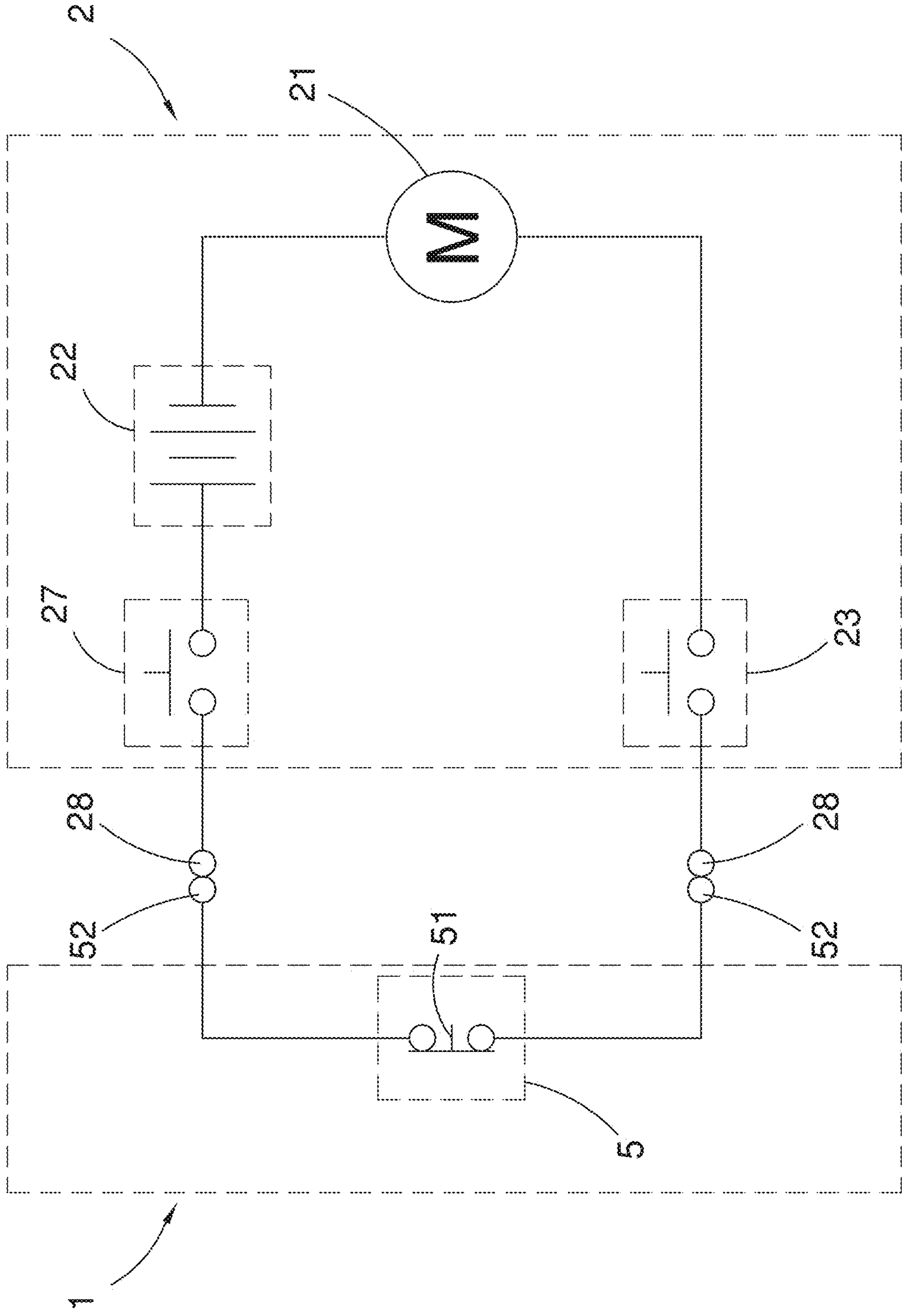
FIG. 6 demonstrates a schematic diagram of the control circuit used for controlling a motor 21 in this embodiment of the present invention.

In this embodiment, as illustrated in FIG. 6, one end of the power supply 22 is electrically connected to one end of the motor 21 of the pump portion 2. The other end of the motor 21 is electrically connected to one end of the power switch 23, and the other end of the power switch 23 is electrically connected to one end of the mechanical switch 5. The other end of the mechanical switch 5 is electrically connected to one end of the safety switch 27. The other end of the safety switch 27 is electrically connected to the other end of the power supply 22. However, the safety switch 27 is an optional feature. Consequently, the other end of the mechanical switch 5 can be directly electrically connected to the other end of the power supply 22.

In this embodiment, as shown in FIG. 1, the outer button 23*a* of the power switch 23 is disposed on the pump portion 2. When a user presses the outer button 23*a*, it activates the inner button 23*b* (refer to FIG. 12) of the power switch 23. At this point, the power switch 23 transitions from a non-conductive state to a conductive state. Subsequently, when the user presses the outer button 23*a* again, the inner button 23*b* is once more pressed, causing the power switch 23 to transition from the conductive state back to the non-conductive state. In simple terms, pressing the outer button 23*a* turns on the power switch 23, keeping it in a conductive state. Pressing the outer button 23*a* again turns off the power switch 23, keeping it in a non-conductive state, and so on. The operation of the safety switch 27 is similar to that of the power switch 23. The key difference is that the state of the safety switch 27 is not determined by user button presses but by the operation of a lock mechanism 7 (see FIG. 10), which will be explained later.

Once the electric oil pump of the present invention is installed on the oil drum 61, as shown in FIGS. 2 and 6, provided that the power switch 23 and safety switch 27 (if configured) are both turned on, the motor 21 of the pump portion 2 will start running. This is because the mechanical switch 5 is normally in a conductive state, and at this point, there is relatively low pressure within the fluid passage 11. The motor 21 drives the impeller 14 to rotate, causing oil (not shown in the figures) from the oil drum 61 to be drawn into the dip tube 121, pushing the valve ball 9 inside the container lock adapter 64, and flowing into the dispensing nozzle 62 through the fluid passage 11. At this stage, since the trigger 621 of the dispensing nozzle 62 has been pressed, oil entering the dispensing nozzle 62 continues to flow out from the spout 622 of the dispensing nozzle 62. However, once the trigger 621 of the dispensing nozzle 62 is released, as shown in FIG. 3, the oil flowing into the dispensing nozzle 62 through the fluid passage 11 cannot exit from the spout 622 of the dispensing nozzle 62. This results in a sudden increase in pressure within the fluid passage 11, causing the movable element 32 of the pressure trigger 3 to be driven from the non-triggered position to the triggered position due to the sudden pressure rise. At the triggered position, it presses the pressing member 51 of the mechanical switch 5, causing the mechanical switch 5 to enter a non-conductive state, and as a result, the motor 21 stops running. In summary, by employing the configuration of the pressure trigger 3 and the mechanical switch 5, the trigger 621 of the dispensing nozzle 62 can control the start or stop of the electric oil pump of the present invention.

In the period when the trigger 621 of the dispensing nozzle 62 is in the released state, although the valve ball 9 inside the container lock adapter 64 returns to its original position (as shown by the circular dashed line) due to the cessation of oil flow, thereby blocking the hole 91 above the inlet 12. As shown in FIG. 3, ideally, the oil within the fluid passage 11 should remain within the fluid passage, and the pressure within the fluid passage 11 should be maintained above a predetermined upper limit. This would result in the pressing member 51 of the mechanical switch 5 being continuously pressed by the movable element 32, causing the motor 21 to remain in the stopped state. However, there is a possibility that the valve ball 9 may not completely block the hole 91, allowing oil within the fluid passage 11 to flow back toward the inlet of the dip tube 121 through a small gap between the valve ball 9 and the hole 91. If the backflow occurs too rapidly, the pressure within the fluid passage 11 will quickly drop below the predetermined lower limit, causing the movable element 32 to return to the non-triggered position too quickly, resulting in the motor 21 quickly resuming operation. However, at this point, the trigger 621 of the dispensing nozzle 62 is still in the released state, so the pressure within the fluid passage 11 will rapidly rise above the upper limit again, causing the motor 21 to subsequently stop. In short, during the period when the trigger 621 of the dispensing nozzle 62 is in the released state, the occurrence of the aforementioned rapid backflow phenomenon leads to the intermittent starting and stopping of the motor 21. To mitigate this problem, as shown in FIGS. 4 and 5, the pressure trigger 3 further comprises a buffer mechanism 4. However, this is not a necessary configuration. For instance, if the valve ball 9 functions well with no aforementioned rapid backflow issue or if there is no requirement to address the aforementioned problem, the buffer mechanism 4 can be omitted.

As shown in FIGS. 2, 4, and 5, the buffer mechanism 4 is disposed on the casing 31 to slow down the return speed of the movable element 32 to the non-triggered position. In this embodiment, within the casing 31, there is a through aperture 312 in communication with the channel 310. The buffer mechanism 4 comprises a spring 41 and a detent ball 42 located within the aperture 312, and preferably includes a support member 43. The detent ball 42 is situated at one end of the aperture 312, while the support member 43 is fixed at the other end of the aperture 312. The spring 41 has its two ends abutting against the support member 43 and the detent ball 42, and it uses its own elasticity to push the detent ball 42 against the movable element 32, keeping it in a pressed state. This arrangement applies an appropriate restraining force on the movable element 32, ensuring that the movement of the movable element 32 encounters suitable resistance, thus slowing down its descent. Consequently, the problem of the intermittent starting and stopping of the motor 21 can be appropriately alleviated. Furthermore, the movable element 32 is formed with a ring groove 323 where the detent ball 42 can slide into.

Figure 7:
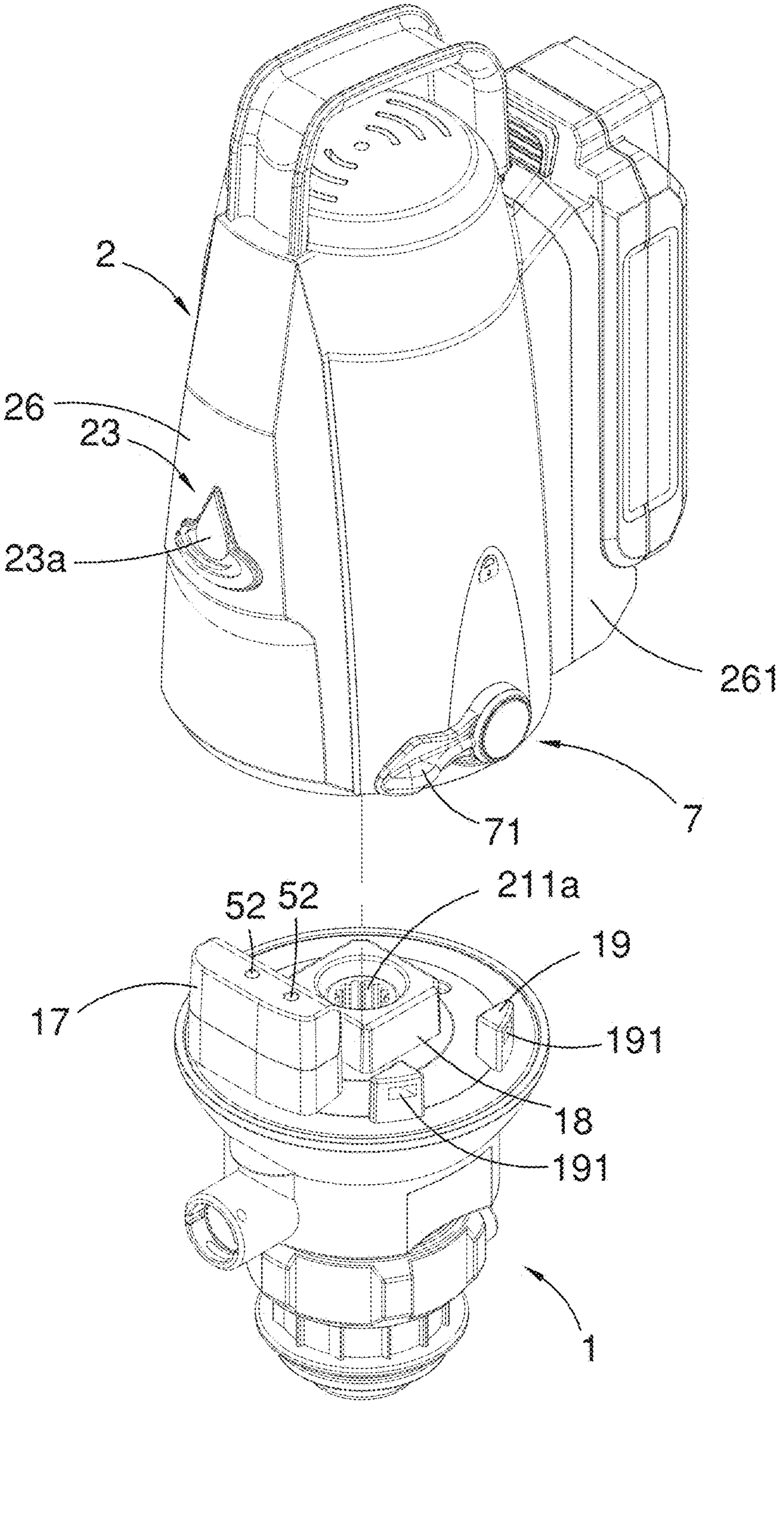
FIG. 7 illustrates a three-dimensional exploded view of this embodiment of the present invention.
Figure 9:
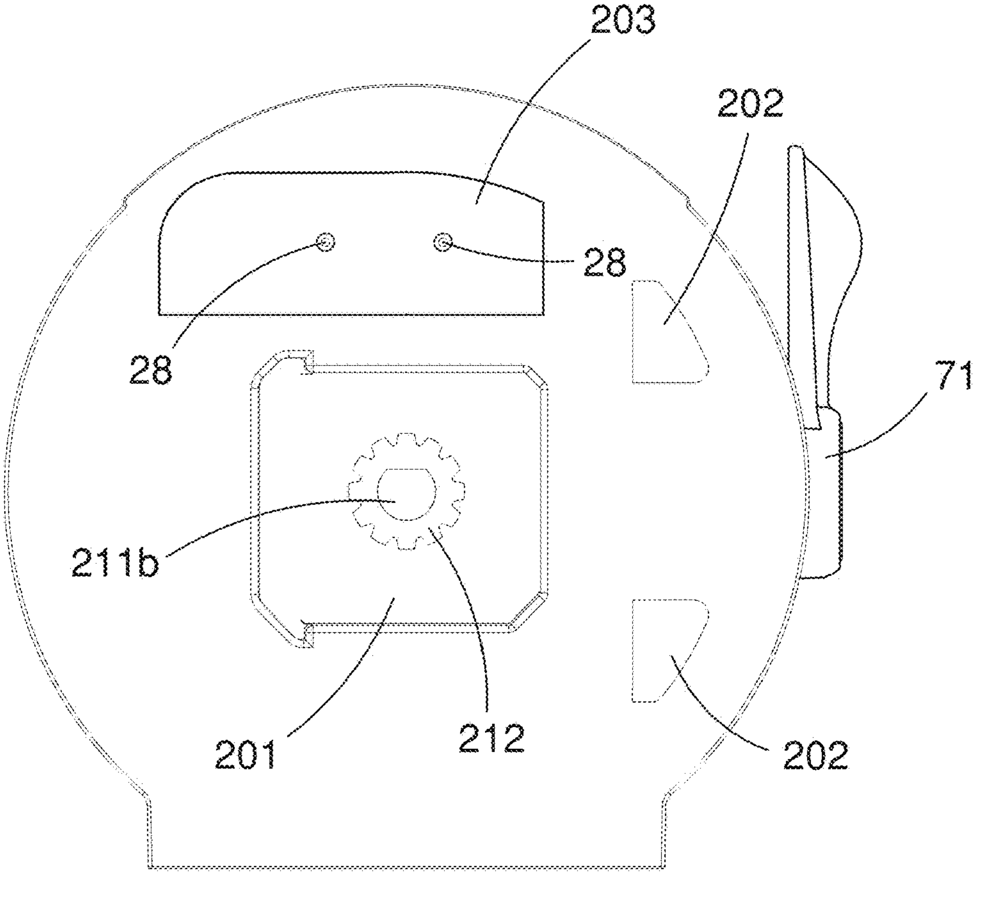
FIG. 9 shows a bottom view of the pump portion 2 in this embodiment of the present invention.

As shown in FIG. 7, the base portion 1 and the pump portion 2 are separable, meaning that the pump portion 2 can be assembled onto the base portion 1 or detached from it. In this embodiment, the mechanical switch 5 is disposed in the base portion 1, while the power switch 23 and safety switch 27 (if configured) are disposed in the pump portion 2. Facing the pump portion 2, the base portion 1 has two first electrical contacts 52 exposed at the top, which are electrically connected to both ends of the mechanical switch 5. Each of these first electrical contacts 52 can be a conductive metal pad, among other possibilities. As shown in FIG. 9, the pump portion 2 has two second electrical contacts 28, facing the base portion 1, exposed at the bottom, where one of these second electrical contacts 28 is electrically connected to the other end of the power switch 23, and the other one is electrically connected to the safety switch 27. Each of these second electrical contacts 28 consists of a pin with a predetermined length, although other configurations are possible. When the pump portion 2 is assembled onto the base portion 1, the two first electrical contacts 52 of the base portion 1 establish an electrical connection with the two second electrical contacts 28 of the pump portion 2. This connection creates an electrical circuit comprising the mechanical switch 5, power switch 23, safety switch 27 (if configured), power supply 22, and motor 21, as illustrated in FIG. 6. Conversely, when the pump portion 2 is detached from the base portion 1, the two first electrical contacts 52 of the base portion 1 become disconnected from the two second electrical contacts 28 of the pump portion 2, resulting in the separation of the control circuit into two parts.

Figure 8:
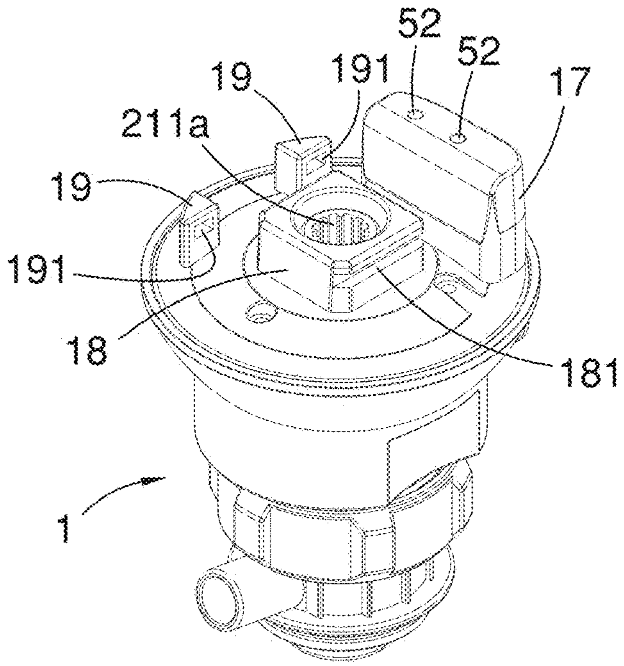
FIG. 8 shows a three-dimensional exterior view of a base portion 1 in this embodiment.

In this embodiment, as shown in FIGS. 7 and 8, the top of the base portion 1 has a convex cover 17, within which the mechanical switch 5 is positioned. The two first electrical contacts 52 are located on the top surface of the convex cover 17. As illustrated in FIG. 9, the bottom of the pump portion 2 has an accommodation 203, and the two second electrical contacts 28 are situated inside this accommodation 203. The shape of the accommodation 203 corresponds to the contour of the convex cover 17. When the pump portion 2 is assembled onto the base portion 1, the convex cover 17 fits snugly into the accommodation 203, and the two first electrical contacts 52 establish an electrical connection with the two second electrical contacts 28 of the pump portion 2.

In this embodiment, the lock mechanism 7 shown in FIG. 1 includes at least one concave disposed on the base portion 1. For instance, as shown in FIGS. 7 and 8, there's a first projection 18 on the top of the base portion 1, which has a first concave 181, and two second projections 19, each having a second concave 191. Correspondingly, as shown in FIG. 9, the bottom of the base portion 1 forms a first recess 201 and two second recesses 202.

Furthermore, as shown in FIGS. 7 and 8, the lock mechanism 7 includes at least one block and a handle 71 disposed on the pump portion 2. For instance, there are two front blocks 731 and one rear block 732 formed on the slider 73 of the pump portion 2. The handle 71 is used to actuate the at least one block, causing it to engage or disengage with the at least one concave on the base portion 1. For example, the handle 71 is connected to a lead screw 72, which threads into the slider 73. Actuating the handle 71 drives the rotation of the lead screw 72, and this rotary motion of the lead screw 72 moves the slider 73, thereby causing the front blocks 731 and the rear block 732 to move accordingly.

Figure 10:
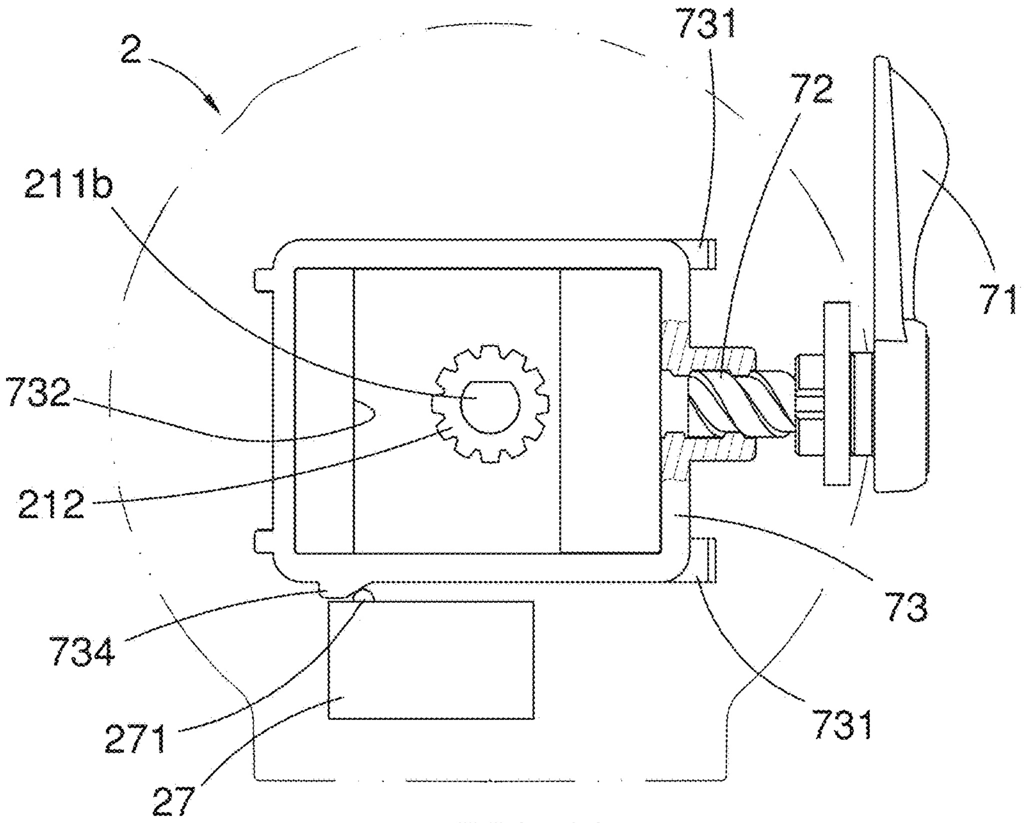
FIGS. 10 and 11 show operational schematic diagrams of a lock mechanism 7 in this embodiment of the present invention.
Figure 11:
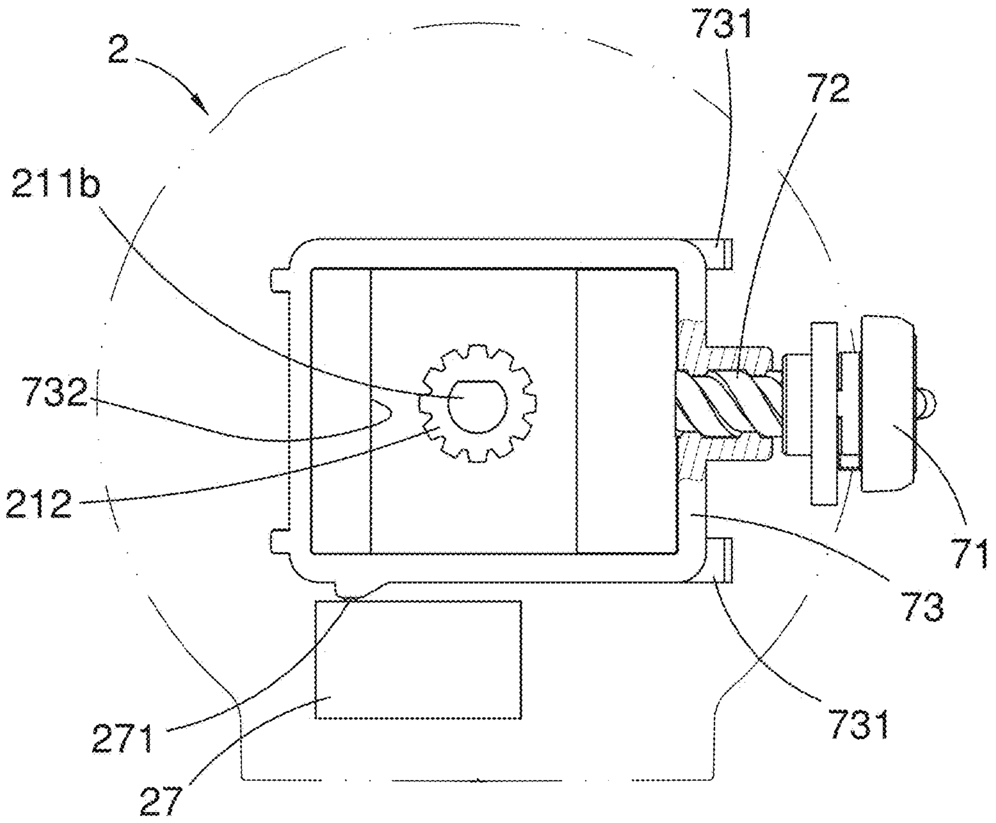

When the pump portion 2 is assembled onto the base portion 1, in addition to the convex cover 17 on the base portion 1 wedging into the accommodation 203 of the pump portion 2, the first projection 18 is inserted into the first recess 201, and each second projection 19 is respectively inserted into each second recess 202. At this point, at least one block on the pump portion 2 is aligned with the respective at least one concave on the slider 73. For instance, the rear block 732 aligns with the first concave 181, and the two front blocks 731 align with the two second concave 191 respectively. Then, when the handle 71 is moved from the unlocked position as shown in FIG. 7 to the locked position as shown in FIG. 1, the forward rotation of the lead screw 72 causes the slider 73 to slide linearly from an unlocked position as shown in FIG. 10 to a locked position as shown in FIG. 11. In this locked position, the at least one block on the pump portion 2 engages with the respective at least one concave on the base portion 1. For instance, the rear block 732 engages with the first concave 181, and the two front blocks 731 engage with the two second concave 191. This operation securely locks the pump portion 2 onto the base portion 1, ensuring that it will not detach from the base portion 1. Conversely, when the handle 71 is moved back from the locked position to the unlocked position, the reverse rotation of the lead screw 72 causes the slider 73 to slide back to the non-locked position, allowing the pump portion 2 to be removed from the base portion 1.

It should be noted that, as shown in FIGS. 10 and 11, the safety switch 27 is located on one side of the slider 73. When the slider 73 reaches the locked position as shown in FIG. 11, one side of the slider's side block 734 precisely presses the button 271 of the safety switch 27. At this point, the safety switch 27 is turned on, transitioning from a non-conductive state to a conductive state. Conversely, when the slider 73 returns to the non-locked position as shown in FIG. 10, the side block 734 of the slider no longer presses the button 271 of the safety switch 27. In this case, the safety switch 27 is turned off, returning from the conductive state to the non-conductive state.

In summary, whenever the safety switch 27 is in the conductive state, it means that the handle 71 is in the locked position, and the pump portion 2 is securely locked onto the base portion 1. At this point, when the power switch 23 is turned on, the motor 21 of the pump portion 2 can operate as described earlier. Conversely, if the safety switch 27 is in the non-conductive state, it means the pump portion 2 is not securely locked onto the base portion 1. In this case, even if the power switch 23 is turned on, the motor 21 of the pump portion 2 will not operate.

Figure 12:
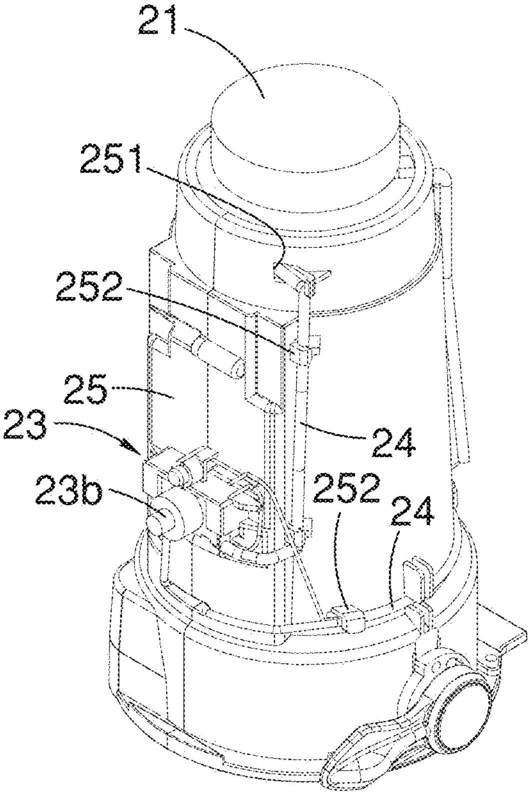
FIG. 12 exhibits a three-dimensional exterior view of an inner housing 25 in this embodiment.
Figure 13:
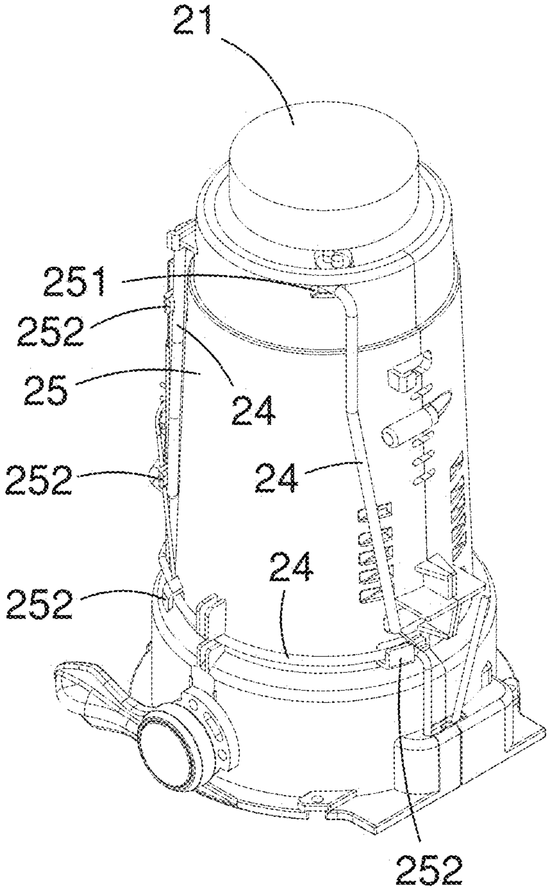
FIG. 13 offers a three-dimensional exterior view of the inner housing 25 from another angle in this embodiment.

In this embodiment, the pump portion 2 also includes an outer housing 26, as shown in FIG. 7, and an inner housing 25, as shown in FIG. 12. The inner housing 25 is located within the outer housing 26. The power switch 23 is disposed on the outer surface of the inner housing 25. The motor 21 is disposed inside the inner housing 25, with the top of the motor 21 protruding from the inner housing 25. As shown in FIGS. 12 and 13, the inner housing 25 is equipped with several through bores 251 at predetermined positions where wires 24 required for the control circuit can pass through. The wires 24 are routed along the outer surface of the inner housing 25, which has multiple wire hooks 252 used to secure the wires 24, ensuring they remain attached to the outer surface of the inner housing 25 and do not come loose.

In addition, the pump portion 2 further includes a battery holder 261. The battery holder 261 is connected to the outer housing 26. The aforementioned rechargeable battery can be installed onto the battery holder 261, and can also be removed from the battery holder 261.

What is claimed is:

1. An electric oil pump, comprising:

a base portion, which can be assembled on an oil drum and has a fluid passage;

a pump portion, disposed on the base portion, capable of executing an oil pumping operation to allow oil from the oil drum to flow through the fluid passage in the base portion, wherein the pump portion is detachable from and attachable to the base portion;

a power supply, configured to provide an electric power required for the pumping operation of the pump portion;

a power switch, disposed on the pump portion;

a mechanical switch, disposed on the base portion and having a pressing member, wherein, when the pressing member is not pressed, the mechanical switch is in a conductive state, and when the pressing member is pressed, the mechanical switch is in a non-conductive state; and a pressure trigger, located between the mechanical switch and the fluid passage, capable of pressing the pressing member when the pressure in the fluid passage is above an upper threshold and releasing the pressing of the pressing member when the pressure in the fluid passage is below a lower threshold, wherein when the pump portion is attached to the base portion, the mechanical switch on the base portion is electrically connected to the power switch on the pump portion, wherein when the pump portion is detached from the base portion, the mechanical switch on the base portion is disconnected from the power switch on the pump portion, and wherein the pressure trigger comprises a casing and a movable element, the casing having a channel and a chamber that communicate with each other, the movable element having a bottom end located within the chamber of the casing, and a top end extending out of the casing through the channel and contacting the pressing member of the mechanical switch, wherein the movable element is normally in a non-triggered position where the pressing member is not pressed, and is movable from the non-triggered position to a triggered position under the pressure in the fluid passage, and presses the pressing member at the triggered position.

2. An electric oil pump as recited in claim 1, wherein the pressure trigger comprises a buffer mechanism disposed on the casing, the buffer mechanism is configured to decelerate the return of the movable element from the triggered position to the non-triggered position.

3. An electric oil pump as recited in claim 1, wherein the casing further has an aperture communicated to the channel, and the pressure trigger comprises a spring and a detent ball both located within the channel, the spring pushes the detent ball against the movable element, keeping the detent ball in a position against the movable element.

4. An electric oil pump as recited in claim 3, wherein the movable element further has a ring groove, into which the detent ball can slide.

5. An electric oil pump as recited in the claim 1, comprising a safety switch, wherein one end of the power supply is electrically connected to one end of a motor of the pump portion, the other end of the motor is electrically connected to one end of the power switch, one end of the safety switch is electrically connected to the other end of the power supply, wherein when the pump portion is attached to the base portion, the other end of the power switch is electrically connected to one end of the mechanical switch, and the other end of the mechanical switch is electrically connected to the other end of the safety switch.

6. An electric oil pump as recited in claim 1, wherein one end of the power supply is electrically connected to one end of a motor of the pump portion, the other end of the motor is electrically connected to one end of the power switch, wherein when the pump portion is attached to the base portion, the other end of the power switch is electrically connected to one end of the mechanical switch, and the other end of the mechanical switch is electrically connected to the other end of the power supply.

7. The electric oil pump as recited in claim 5, wherein the safety switch is disposed in the pump portion, and a top of the base portion facing the pump portion has two exposed first electrical contacts, which are electrically connected to the two ends of the mechanical switch, wherein a bottom of the pump portion facing the base portion has two exposed second electrical contacts, wherein one of the second electrical contacts is electrically connected to the other end of the power switch and the other second electrical contact is electrically connected to the end of the safety switch, wherein when the pump portion is attached to the base portion, the two first electrical contacts of the base portion are electrically connected to the two second electrical contacts of the pump portion, wherein when the pump portion is detached from the base portion, the two first electrical contacts of the base portion are separated from the two second electrical contacts of the pump portion.

8. The electric oil pump as recited in claim 7, wherein the top of the base portion has a convex cover, the mechanical switch is located within the convex cover, the two first electrical contacts are positioned on the top surface of the convex cover, the bottom of the pump portion has an accommodation where the two second electrical contacts are located, wherein when the pump portion is assembled onto the base portion, the convex cover fits precisely into the accommodation.

9. The electric oil pump as recited in claim 8, wherein the pump portion includes an outer housing and an inner housing located within the outer housing, wherein the power switch is disposed on an outer wall of the inner housing, the motor is located within the inner housing, wherein a top of the motor protrudes from the inner housing, and the outer wall of the inner housing has a plurality of wire hooks, wherein the wires from the power supply, motor, power switch, mechanical switch, and safety switch are routed along the outer wall of the inner housing, and the wire hooks are used to secure the wires in place.

10. An electric oil pump as recited in claim 5, wherein the pressure trigger comprises a casing and a movable element, the casing having a channel and a chamber that communicate with each other, the movable element having a bottom end located within the chamber of the casing, a top end of the movable element extending out of the casing through the channel and contacting the pressing member of the mechanical switch, wherein the movable element is normally in a non-triggered position where the pressing member is not pressed, and is movable from the non-triggered position to a triggered position under the pressure in the fluid passage, and presses the pressing member at the triggered position.

11. An electric oil pump as recited in claim 10, wherein the pressure trigger comprises a buffer mechanism disposed on the casing, the buffer mechanism is configured to decelerate the return of the movable element from the triggered position to the non-triggered position.

12. An electric oil pump as recited in claim 11, wherein the casing further has an aperture communicated to the channel, and the pressure trigger comprises a spring and a detent ball both located within the channel, the spring pushes the detent ball against the movable element, keeping the detent ball in a position against the movable element.

13. An electric oil pump as recited in claim 12, wherein the movable element further has a ring groove, into which the detent ball can slide.

14. The electric oil pump as recited in claim 10, wherein the safety switch is disposed in the pump portion, and a top of the base portion facing the pump portion has two exposed second electrical contacts, which are electrically connected to the two ends of the mechanical switch, wherein a bottom of the pump portion facing the base portion has two exposed second electrical contacts, wherein one of the second electrical contacts is electrically connected to the other end of the power switch and the other second electrical contact is electrically connected to the end of the safety switch, wherein when the pump portion is attached to the base portion, the two first electrical contacts of the base portion are electrically connected to the two second electrical contacts of the pump portion, wherein when the pump portion is detached from the base portion, the two first electrical contacts of the base portion are separated from the two second electrical contacts of the pump portion.

15. The electric oil pump as recited in claim 14, wherein the top of the base portion has a convex cover, the mechanical switch is located within the convex cover, the two first electrical contacts are positioned on the top surface of the convex cover, the bottom of the pump portion has an accommodation where the two second electrical contacts are located, wherein when the pump portion is assembled onto the base portion, the convex cover fits precisely into the accommodation.

16. The electric oil pump as recited in claim 11, wherein the safety switch is disposed in the pump portion, and a top of the base portion facing the pump portion has two exposed first electrical contacts, which are electrically connected to the two ends of the mechanical switch, wherein a bottom of the pump portion facing the base portion has two exposed second electrical contacts, wherein one of the second electrical contacts is electrically connected to the other end of the power switch and the other second electrical contact is electrically connected to the end of the safety switch, wherein when the pump portion is attached to the base portion, the two first electrical contacts of the base portion are electrically connected to the two second electrical contacts of the pump portion, wherein when the pump portion is detached from the base portion, the two first electrical contacts of the base portion are separated from the two second electrical contacts of the pump portion.

17. The electric oil pump as recited in claim 16, wherein the top of the base portion has a convex cover, the mechanical switch is located within the convex cover, the two first electrical contacts are positioned on the top surface of the convex cover, the bottom of the pump portion has an accommodation where the two second electrical contacts are located, wherein when the pump portion is assembled onto the base portion, the convex cover fits precisely into the accommodation.

18. The electric oil pump as recited in claim 5, wherein the pump portion includes an outer housing and an inner housing located within the outer housing, wherein the power switch is disposed on an outer wall of the inner housing, the motor is located within the inner housing, wherein a top of the motor protrudes from the inner housing, and the outer wall of the inner housing has a plurality of wire hooks, wherein the wires from the power supply, motor, power switch, mechanical switch, and safety switch are routed along the outer wall of the inner housing, and the wire hooks are used to secure the wires in place.

* * * * *